Figure 1:
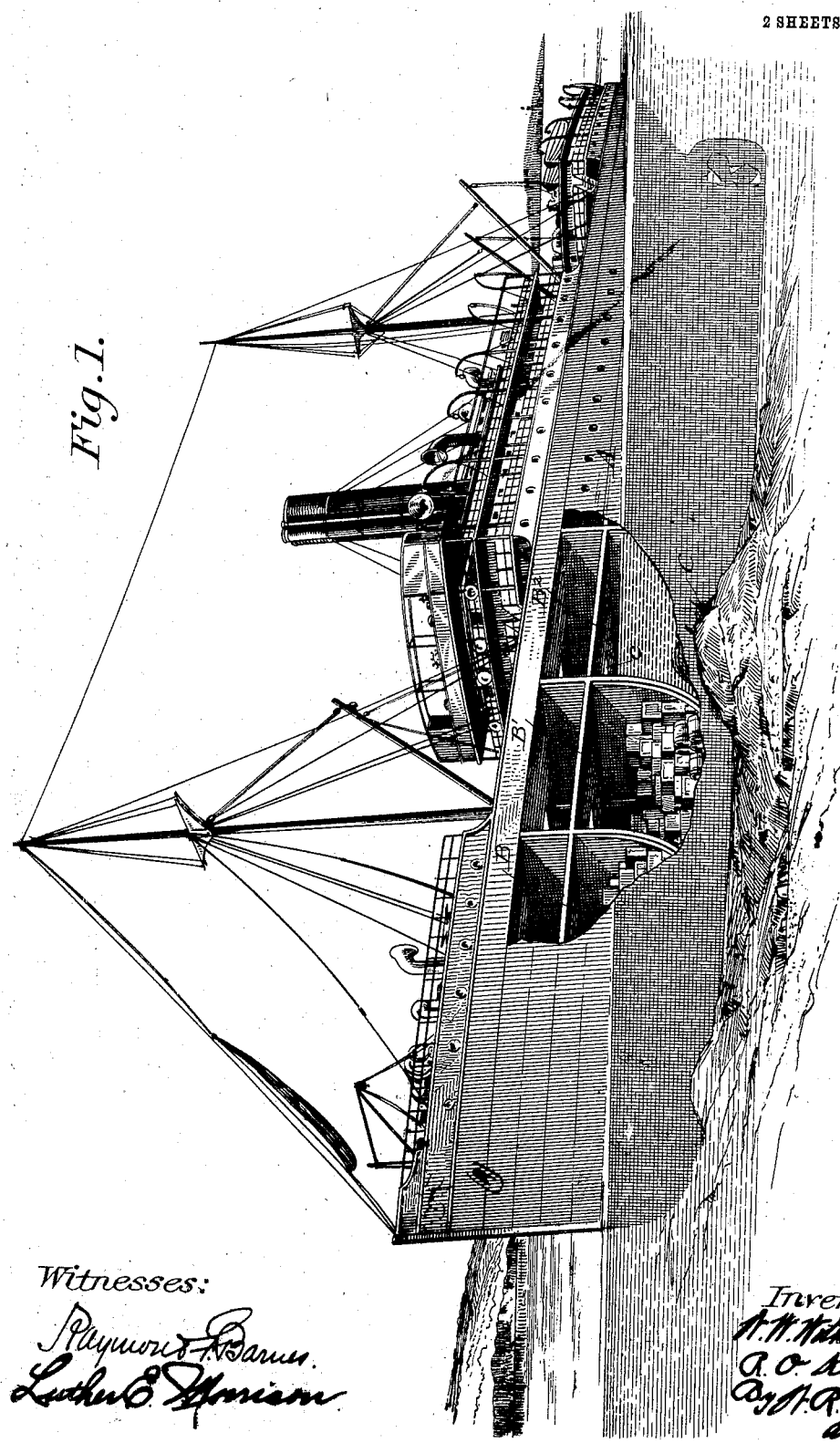

No. 851,270. PATENTED APR. 23, 1907.
W. W. WOTHERSPOON & R. O. KING.
METHOD OF FLOATING SUNKEN OR STRANDED VESSELS.
APPLICATION FILED JAN. 7, 1907.

2 SHEETS—SHEET 1.

No. 851,270. PATENTED APR. 23, 1907.
W. W. WOTHERSPOON & R. O. KING.
METHOD OF FLOATING SUNKEN OR STRANDED VESSELS.
APPLICATION FILED JAN. 7, 1907.

2 SHEETS—SHEET 2.

Witnesses:

Inventors

UNITED STATES PATENT OFFICE.

WILLIAM WALLACE WOTHERSPOON, OF NEW YORK, AND ROBERT OWEN KING, OF NORTH TONAWANDA, NEW YORK.

METHOD OF FLOATING SUNKEN OR STRANDED VESSELS.

No. 851,270.  Specification of Letters Patent.  Patented April 23, 1907.

Application filed January 7, 1907. Serial No. 351,175.

*To all whom it may concern:*

Be it known that we, WILLIAM WALLACE WOTHERSPOON, of New York, in the county of New York and State of New York, and ROBERT OWEN KING, of North Tonawanda, county of Niagara, State of New York, have invented a new and useful Improvement in the Method of Floating Sunken or Stranded Vessels, of which the following is a specification.

This invention relates to the means employed for raising or removing stranded or sunken vessels, and the invention consists of the improved method, designed more particularly for the floating of stranded or partially submerged vessels, where the injury causing their wrecked condition is due to the leakage of water into the hold, either through a hole stove therein or through openings formed by other causes.

In its broad comprehension our improved method involves the treatment of the wrecked vessel so as to render the compartment or hold where the injury has occurred, air-tight or substantially so; the introduction into said hold or compartment of air under pressure to expel the water; and finally the provision of means for permitting access by workmen into the hold while the pressure is maintained in order that proper repairs may be made.

In the practical application of our improved method to a stranded vessel, where the water has leaked into a hold or compartment through a hole formed by the vessel going on a rock, the ordinary and usual communications of said compartment with the outside, such as the hatchway, funnels, port holes or other openings, according to the nature of the compartment, are closed air-tight or substantially so by suitable means, so that a pressure of air may be maintained therein to expel the leaking water. The compartment is braced, preferably on the outside, by appropriate means in order that the deck or its walls may withstand the internal pressure to which it will be subjected when the air is introduced. An air-lock is then applied to the compartment, preferably to the air-tight covering of the hatchway, in order to permit workmen to descend into the injured hold and repair the leak, while the pressure is maintained to keep the water out. Air under pressure is then introduced into the compartment from any suitable source, with the result that the water therein will be expelled, and workmen may enter through the air-lock and make the necessary repairs to the leak, either temporary repairs, such as will enable the vessel to be towed into port, or permanent repairs, according to the nature of the injury.

Figure 2:
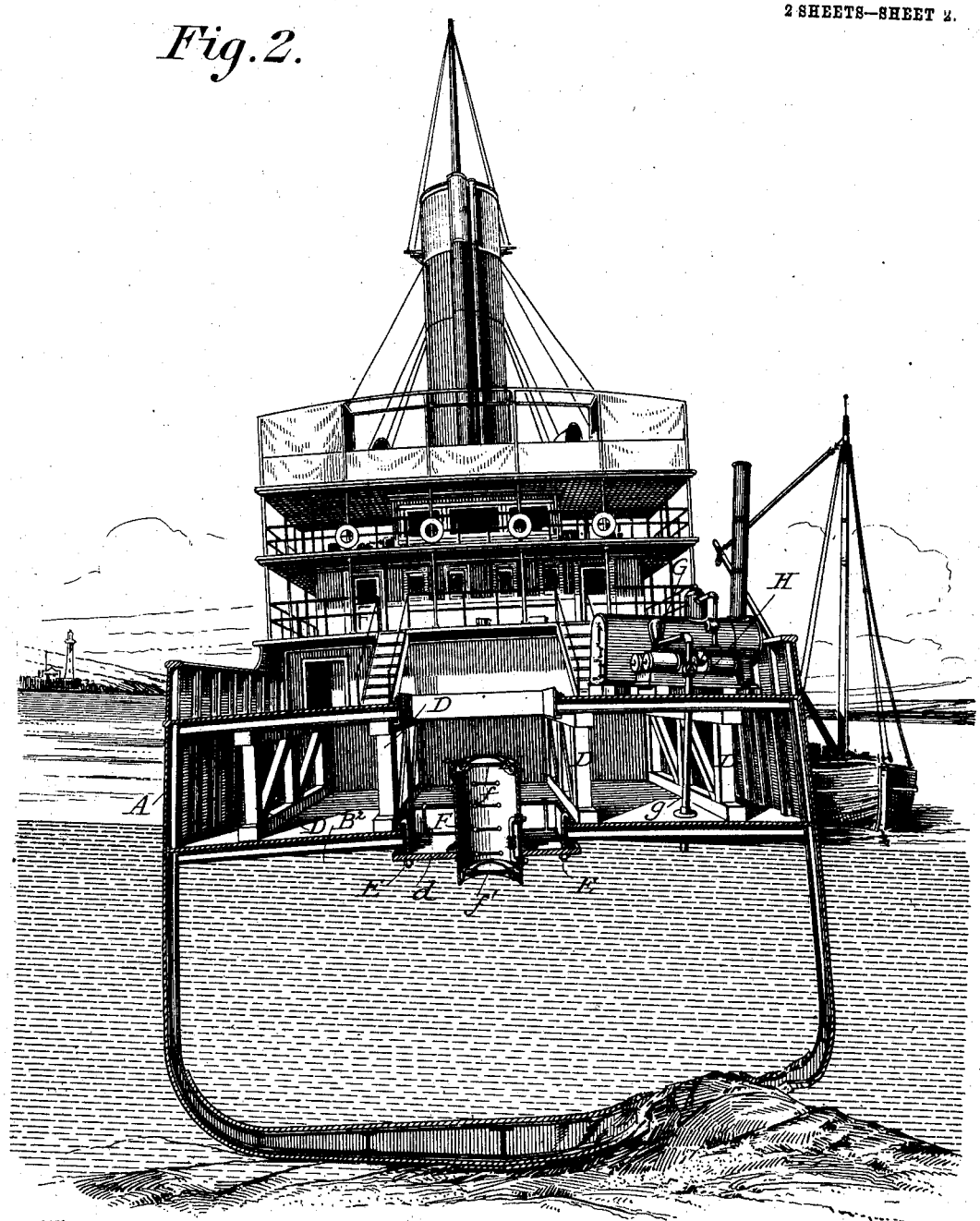

In the accompanying drawings:—Figure 1 represents a view of a stranded vessel resting on a rock with a hole stove in one of the compartments or holds, and the latter filled with water. Fig. 2 is a similar view showing the compartment rendered air-tight so as to receive the air pressure, showing also the compartment braced to withstand the internal strain, and showing further an air-lock applied to the compartment, and means for the introduction into the compartment of air under pressure to expel the water.

Referring to the drawings:—A represents the hull of a vessel divided into compartments B B', etc., one of which B², as shown in Fig. 1, has a hole C stove therein, and which compartment has filled with water causing the vessel to settle on a rock. The leaking compartment is provided with the usual hatchway c.

In applying our improved method, the first step is to brace or strengthen the top or deck portion of the hold so that it will withstand without injury the internal pressure to which it will be subjected when air under pressure is introduced. This strengthening may be accomplished in any appropriate manner, preferably, however, by beams or braces D applied between the top or deck of the injured hold, and the next deck above; or other suitable means may be employed for this purpose, such as would be demanded by the particular conditions as to the structure and form of the vessel. The compartment is next closed air-tight by the application to the hatchway of a plate or covering d. This plate is applied against the edge of the coaming, a rubber gasket being interposed so as to form a tight joint. In applying the plate or covering and its gasket, suitable means should be employed for holding the same temporarily against the coaming before the air pressure is turned on. This may be accomplished by means of vertical stay bolts E sustained by the deck and passing downward through the covering. Or other means may be employed for this purpose, the idea being that the plate being applied to the inner side of the hold, some means are desirable for giving it temporary support until the air pressure being turned on it will act to bind the covering tightly against the coaming and effect an air-tight joint. If there are other communications of the injured compartment with the outside such as port holes, funnels, etc., these are also by appropriate means closed air-tight. The next step in the method is to provide means for the access into the compartment of workmen while the pressure is maintained therein so that an inspection of the injured compartment may be made, and if necessary the leaks repaired. This is effected by the application preferably to the covering of the hatchway of an air-lock such as is employed in connection with caissons, and consisting of a chamber F with a door $f$ communicating with the outside, and with a second door $f'$ communicating with the hold. The next step in the method consists in introducing air under pressure into the compartment in order to expel the water which has leaked therein. This may be done in any appropriate manner. As shown in Fig. 2, an air-compressor G is mounted on the upper deck or any appropriate location, and driven by an engine H, the compressor being connected by pipe $g$ with the leaking compartment, with the result that when the air is forced into said compartment the water will be expelled through the hole. While the pressure is maintained, workmen, through the medium of the air-lock, may enter the hold and make such repairs as may be necessary.

If the hole is stove in the side of the compartment, the application of the air pressure will force the water out to the level of the top of the hole so that it may be closed by applying a covering from the top downward. When the covering has thus been applied so as to prevent the further access of water, that remaining may be removed in any suitable manner, either by pumps, but preferably the water is blown out through the scupper pipes, or a blow pipe may be introduced and the removal of the water effected in this manner.

It is to be understood that the above method of procedure may be applied in connection with any hold or compartment which has become injured, the essential idea being that the injured compartment be rendered air-tight; that means be provided for the introduction of air under pressure therein to expel the water; and further that means be provided for the access of workmen into the injured hold, while the pressure is maintained.

When two or more compartments have been injured and the water has leaked therein, they may all be treated in the same manner, and the air introduced simultaneously into all of them from a single source of pressure. Under these circumstances, the degree of pressure of air necessary to expel the water may vary in the different compartments according to the location of the leak, the list of the vessel and other conditions such as would cause the existence of different hydrostatic pressures. To meet these conditions, it is proposed to provide for adjusting or varying the air pressure admitted to the several compartments, according to the resistance to be encountered. This may be effected in a variety of ways, but conveniently by the application of reducing valves to the pipes through which the air enters the compartments from the compressor.

Having thus described our invention, what we claim is:—

1. The method of treating leaking stranded vessels, which consists in sealing air-tight or substantially so the usual communication of the leaking compartment with the outside, providing said compartment with means for the entrance of workmen therein under air pressure in excess of that of the atmospheric air, and finally introducing air under pressure into said compartment to expel the leaking water; whereby workmen may enter while the pressure is maintained, and make an examination of the interior of the compartment.

2. The method of treating leaking stranded vessels, which consists in rendering the leaking compartment air-tight or substantially so, introducing air under pressure therein to expel the water, providing means for the access of workmen into said compartment while the air pressure is maintained, and finally repairing the leak.

3. The method of treating leaking stranded vessels, which consists in closing air-tight the ordinary communications of the leaking compartment with the outside, introducing air under pressure into said compartment, providing for the access of workmen therein while the air pressure is maintained, closing the leak, and finally removing any water remaining after the leak is closed.

4. The method of treating leaking stranded vessels, in which the leak or hole is in the side of the compartment, which method consists in closing said compartment air-tight or substantially so, introducing air under pressure therein to expel the water to the top of the hole, providing for the entrance of workmen into said compartment while the air pressure is maintained, and applying a covering progressively to the hole from the top downward.

In testimony whereof we hereunto set our hands this eighteenth day of December 1906, in the presence of two attesting witnesses.

WILLIAM WALLACE WOTHERSPOON.
ROBERT OWEN KING.

Witnesses:—
GANBURY A. SEDDEN,
EMILY HAIL.